United States Patent
Probst et al.

(10) Patent No.: US 6,528,573 B1
(45) Date of Patent: Mar. 4, 2003

(54) AQUEOUS TWO-COMPONENT POLYURETHANE SYSTEMS WITH INCREASED IMPACT RESISTANCE AND GOOD STABILITY PROPERTIES, METHOD FOR PRODUCING SAME AND THEIR USE

(75) Inventors: Joachim Probst, Leverkusen (DE); Ulrich Biskup, Leverkusen (DE); Claus Kobusch, Shanghai (CN)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,206

(22) PCT Filed: Dec. 6, 1999

(86) PCT No.: PCT/EP99/09523

§ 371 (c)(1), (2), (4) Date: Jun. 13, 2001

(87) PCT Pub. No.: WO00/37522

PCT Pub. Date: Jun. 29, 2000

(30) Foreign Application Priority Data

Dec. 18, 1998 (DE) .......................... 198 58 733

(51) Int. Cl.$^7$ .............................. C08L 75/00
(52) U.S. Cl. ....................... 524/507; 524/589
(58) Field of Search ................. 524/507, 589

(56) References Cited

U.S. PATENT DOCUMENTS

| | | | |
|---|---|---|---|
| 3,124,605 A | 3/1964 | Wagner | 260/453 |
| 3,358,010 A | 12/1967 | Britain | 260/453 |
| 3,903,126 A | 9/1975 | Woerner et al. | 260/453 AB |
| 3,903,127 A | 9/1975 | Wagner et al. | 260/453 AB |
| 3,976,622 A | 8/1976 | Wagner et al. | 260/77.5 AT |
| 4,324,879 A | 4/1982 | Bock et al. | 528/45 |
| 4,663,377 A | 5/1987 | Hombach et al. | 524/196 |
| 5,075,370 A | 12/1991 | Kubitza et al. | 524/591 |
| 5,124,427 A | 6/1992 | Potter et al. | 528/67 |
| 5,200,489 A | 4/1993 | Jacobs et al. | 528/49 |
| 5,202,377 A | 4/1993 | Thorne et al. | 524/591 |
| 5,252,696 A | 10/1993 | Laas et al. | 528/49 |
| 5,281,655 A * | 1/1994 | Mitsuji | 524/507 |
| 5,334,637 A | 8/1994 | Zwiener et al. | 524/539 |
| 5,387,367 A | 2/1995 | Haeberle et al. | 252/182.22 |
| 5,468,804 A | 11/1995 | Schmalstieg et al. | 524/591 |
| 5,473,011 A | 12/1995 | Laas et al. | 524/840 |
| 5,563,207 A | 10/1996 | Brahm et al. | 524/591 |
| 5,583,176 A | 12/1996 | Haberle | 524/591 |
| 5,670,600 A | 9/1997 | Nienhaus et al. | 528/75 |
| 5,852,111 A * | 12/1998 | Watanabe | 524/839 |
| 5,994,421 A * | 11/1999 | Otani | 521/137 |
| 6,166,127 A * | 12/2000 | Tomko | 524/507 |

FOREIGN PATENT DOCUMENTS

| | | |
|---|---|---|
| EP | 557844 | 9/1993 |
| EP | 649866 | 4/1995 |
| EP | 842991 | 5/1998 |
| WO | 97/31960 | 9/1997 |

* cited by examiner

*Primary Examiner*—Edward J. Cain
(74) *Attorney, Agent, or Firm*—Joseph C. Gil; Thomas W. Roy

(57) ABSTRACT

This invention relates to aqueous two-component polyurethane systems, to a process for producing them, and to their use for the production of coatings having an enhanced impact strength and good resistance to solvents.

9 Claims, No Drawings

AQUEOUS TWO-COMPONENT POLYURETHANE SYSTEMS WITH INCREASED IMPACT RESISTANCE AND GOOD STABILITY PROPERTIES, METHOD FOR PRODUCING SAME AND THEIR USE

BACKGROUND OF THE INVENTION

This invention relates to aqueous two-component polyurethane systems, to a process for producing them, and to their use for the production of coatings having an enhanced impact strength and good resistance to solvents.

Environmental questions play an important part in surface technology. One particularly pressing problem is to achieve a reduction in the amounts of organic solvents which are used for lacquers and coating materials.

For chemically crosslinking polyurethane lacquers, which on account of their outstanding properties are of considerable importance in the coating sector, it has not been possible hitherto to dispense with the use of organic solvents. The use of water instead of organic solvents in two-component polyurethane lacquers based on polyisocyanates comprising free isocyanate has hitherto seemed impossible, since it is known that isocyanate groups not only react with alcoholic hydroxyl groups, but also react with water. Furthermore, the concentration of active hydrogen atoms which originate from water is of course far higher than the concentration of hydroxyl groups in the organic component which reacts with NCO, so that it must be assumed from this that the main reaction which proceeds in a polyisocyanate/organic polyhydroxy compound/water ternary system is a reaction between isocyanate and water with the formation of urea and carbon dioxide, which firstly does not result in crosslinking of the organic polyhydroxy compounds and secondly results in foaming of the lacquer batch due to the formation of carbon dioxide.

It is known from EP-A 358 979 that if selected polyhydroxyl compounds based on vinyl polymers are used as co-reactants for organic polyisocyanates comprising free isocyanate groups, aqueous two-component polyurethane systems can be produced by the emulsification, in the aqueous polymer solution or dispersion, of the polyisocyanate comprising free isocyanate groups. The polyhydroxyl compounds described in EP-A 0 358 979 are preferably polymerised by a radical mechanism in organic solution and are subsequently converted, in an aqueous solution of a neutralising agent—mostly of ammonia or tertiary amines, into a form in which they are dissolved in water. The organic solvent can remain in the aqueous medium if need be, or can be removed by distillation.

Polymer polyols which are produced in this manner normally exhibit single-phase morphology, and therefore exhibit either thermoplastic or elastomeric properties after crosslinking and film formation with suitable hydrophobic polyisocyanates and/or polyisocyanates which have been rendered hydrophilic. A single-phase structure of a polymer polyol such as this is generally not satisfactory for the production of polyurethane films which exhibit the properties of a thermoplastic elastomer which possesses both excellent toughness properties and a high level of strength.

It has been shown that polymer polyol systems of two-phase or multi-phase structure, in combination with suitable polyisocyanates, result in polyurethane coatings with a high level of toughness, particularly at low temperatures.

SUMMARY OF THE INVENTION

The present invention therefore relates to two-component polyurethane coating media, which contain, as a binder vehicle component, a) a polyol component consisting of at least two polymer polyols, wherein the first is present as a discrete phase and as an elastic component a1) dispersed in a second thermoplastic component a2), and b) a polyisocyanate component which has a viscosity of at the most 10,000 mPa.s and which consists of at least one organic polyisocyanate, in amounts corresponding to an NCO/OH equivalent ratio from 0.2:1 to 5:1, characterised in that component a) constitutes an aqueous solution and/or dispersion of a mixture of at least two vinyl polymer polyols of the aforementioned type in which polyisocyanate component b) is present in emulsified or solubilised form.

DETAILED DESCRIPTION OF THE INVENTION

Component a) is a polyol component which consists of a mixture of at least two polyols a1) and a2) which are based on vinyl polymers. Polyols a1) and a2) are not chemically bonded to each other before they are crosslinked with isocyanate component b).

Polyol a1) is an elastomer component which contains hydroxyl groups, sulphonate and/or carboxylate groups, preferably carboxylate groups, and which optionally contains sulphonic acid and/or carboxyl groups, preferably carboxyl groups. Component a1) comprises polymers of olefinically unsaturated monomers, which preferably have a (number average) molecular weight Mn as determined by the gel permeation chromatography method of 500 to 500,000 g/mol, particularly 1000 to 200,000 g/mol (with respect to the uncrosslinked constituents), a hydroxyl number of 8 to 264, preferably 16 to 198 mg KOH/g solid resin, and an acid number (with respect to the sum of the un-neutralised and neutralised acid groups) of 0 to 100, preferably 3 to 50 mg KOH/g solid resin. Elastomer component a1) has a glass transition temperature (as measured by the DSC or the DMA method) of 0° C. at most, preferably of −10° C. at most.

Thermoplastic constituent a2) is likewise a polyol which contains hydroxyl groups, sulphonate and/or carboxylate groups, preferably carboxylate groups, and which optionally contains sulphonic acid and/or carboxyl groups, preferably carboxyl groups. Component a2) is likewise a polymer of olefinically unsaturated monomers, which preferably has a (number average) molecular weight Mn as determined by the gel permeation chromatography method of 500 to 500,000 g/mol, particularly 1000 to 200,000 g/mol (with respect to the uncrosslinked constituents), a hydroxyl number of 16 to 264, preferably 33 to 198 mg KOH/g solid resin, and an acid number (with respect to the sum of the un-neutralised and neutralised acid groups) of 3 to 100, preferably 5 to 50 mg KOH/g solid resin. Thermoplastic component a2) has a glass transition temperature of at least 0° C., preferably of at least +10° C.

Elastomer components a1) which are synthesised from the following comonomer components are quite particularly preferred:

| | | |
|---|---|---|
| a1 | a) 0.4–7.7% by weight | acrylic acid and/or methacrylic acid; |
| a1 | b) 3.4–50.8% by weight | acrylic acid 2-hydroxyethyl ester and/or acrylic acid hydroxypropyl ester and/or methacrylic acid 2-hydroxyethyl ester and/or hydroxypropyl methacrylate; |
| a1 | c) 0–20% by weight | methyl methacrylate and/or acrylonitrile and/or methacrylonitrile and/or styrene or substituted styrenes as comonomers |

| | | -continued |
|---|---|---|
| | | with a strength- and hardness-imparting character; |
| a1 | d) 70–96% by weight | alkyl methacrylates comprising 2 to 12 C atoms in their alkyl radical and/or alkyl acrylates comprising 1 to 12 C atoms in their alkyl radical as elasticising components; |
| a1 | e) 0–5% by weight | crosslinking comonomers, such as divinylbenzene, ethylene glycol di(meth)acrylate, propylene glycol di(meth)acrylate, butylene glycol di(meth)acrylate or allyl (meth)acrylate; | wherein the sun of the percentages by weight of a1 a) to a1 e) is 100 and wherein the glass transition temperature is below −10° C.

Thermoplastic components a2) which are synthesised from the following comonomer components are quite particularly preferred:

| a2 | a) 0.6–7.7% by weight | acrylic acid and/or methacrylic acid; |
|---|---|---|
| a2 | b) 6.8–50.8% by weight | acrylic acid 2-hydroxyethyl ester and/or acrylic acid hydroxypropyl ester and/or methacrylic acid 2-hydroxyethyl ester and/or hydroxypropyl methacrylate; |
| a2 | c) 30–80% by weight | methyl methacrylate and/or acrylonitrile and/or methacrylonitrile and/or styrene or substituted styrenes as comonomers with a strength- and hardness-imparting character; |
| a2 | d) 5–40% by weight | alkyl methacrylates comprising 2 to 12 C atoms in their alkyl radical and/or alkyl acrylates comprising 1 to 12 C atoms in their alkyl radical as elasticising components; |
| a2 | e) 0–5% by weight | crosslinking comonomers, such as divinylbenzene, ethylene glycol di(meth)acrylate, propylene glycol di(meth)acrylate, butylene glycol di(meth)acrylate or allyl (meth)acrylate; | wherein the sum of the percentages by weight of a2 a) to a2 e) is 100 and wherein the glass transition temperature is above +10° C.

Elastomer component a1) and thermoplastic component a2) are preferably mixed in ratios by weight from 10:90 to 60:40 (with respect to the solid resin).

The present invention also relates to a process for producing a two-component polyurethane coating medium which contains, as a binder vehicle component, a) a polyol component consisting of at least two polymer polyols, wherein the first is present as a discrete phase and as an elastic component a1) dispersed in a second thermoplastic component a2), and b) a polyisocyanate component which has a viscosity of at the most 10,000 mPa.s and which consists of at least one organic polyisocyanate, in amounts corresponding to an NCO/OH equivalent ratio from 0.2:1 to 5:1, characterised in that component a) constitutes an aqueous solution and/or dispersion of a mixture of at least two vinyl polymer polyols of the aforementioned type in which polyisocyanate component b) is present in emulsified or solubilised form.

Polymer components a1) and a2), which comprise hydroxyl groups, are produced by radical polymerisation processes known in the art, in an organic or in an aqueous phase. These polymers are preferably produced by a process comprising emulsion polymerisation by a radical mechanism in an aqueous medium.

It is possible to employ continuous or discontinuous polymerisation processes. Discontinuous processes include batch and feed processes, wherein feed processes are preferred. In a feed process, water on its own or with a portion of an anionic emulsifier, optionally admixed with a non-ionic emulsifier and with a portion of the monomer mixture, is placed in a vessel and is preheated to the polymerisation temperature, polymerisation is initiated by a radical mechanism if a monomer batch is used, and the remaining monomer mixture, together with an initiator mixture and the emulsifier, is added over the course of 1 to 10 hours. preferably 3 to 6 hours, The batch is optionally subsequently post-activated again in order to effect polymerisation to give a conversion of at least 99%.

Polymers a1) and a2), which contain hydroxyl groups, can be produced by employing techniques of metered addition such that core-shell polymers are produced (see M. J. Devon et al., J. Appl. Polym. Sci. 39 (1990) pages 2119–2128, for example). In the course of this procedure, the core can be made hard and hydrophobic and the shell can be made soft and hydrophilic, for example. The converse structure, comprising a soft core and a harder shell, is also possible.

The emulsifiers used here are of an anionic and/or non-ionic nature. Amongst emulsifiers of an anionic nature, those which contain carboxylate groups, or sulphate, sulphonate, phosphate or phosphonate groups can be used. Emulsifiers containing sulphate, phosphate or phosphonate groups are preferred. The emulsifiers may be high molecular weight or low molecular weight substances. The latter are described in DE-A 3 806 066 and DE-A 1 953 349, for example.

The preferred anionic emulsifiers are those which have been neutralised with ammonia or amines. Emulsifiers which are particularly preferred are those which are synthesised from long-chain alcohols or substituted phenols, or from ethylene oxide chains comprising degrees of polymerisation between 2 and 100 and terminal monosulphuric acid ester groups or phosphoric acid mono- and diester groups. Ammonia is generally used as the neutralising agent here, and can be added to the emulsion batch on its own or in any mixtures.

Suitable non-ionogenic emulsifiers, which are mostly used in combination with the aforementioned anionic emulsifiers, include the reaction products of aliphatic, araliphatic, cycloaliphatic or aromatic carboxylic acids, alcohols, phenol derivatives or amines with epoxides, such as ethylene oxide for example. Examples thereof include the reaction products of ethylene oxide with carboxylic acids, such as lauric acid, stearic acid, oleic acid, the carboxylic acids of castor oil, or abietic acid for example, with longer-chain alcohols such as oleyl alcohol, lauryl alcohol or stearyl alcohol, with phenol derivatives such as substituted benzyl or phenylphenols or nonylphenol, and with longer-chain amines such as dodecylamine and stearylamine for example. The reaction products with ethylene oxide are oligo- or polyethers comprising degrees of polymerisation between 2 and 100, preferably from 5 to 50. These emulsifiers are added in amounts of 0.1 to 10% by weight with respect to the mixture of the monomers.

Co-solvents which can optionally be used in conjunction include both water-soluble and water-insoluble solvents. Examples thereof include aromatic compounds such as benzene, toluene, xylene, chlorobenzene, esters such as ethyl acetate or butyl acetate, ether esters such as methyl glycol acetate, ethyl glycol acetate, methoxypropyl—acetate or methoxybutyl acetate, ethers such as butyl glycol, tetrahydrofuran, dioxane, ethyl glycol ethers, ethers of diglycol or ethers of dipropylene glycol, ketones such as acetone, methyl ethyl ketone or methyl isobutyl ketone, trichloromonofluorethane, or cyclic amides such as N-methylpyrrolidone or N-methylcaprolactam.

Radical-initiated polymerisation can be initiated by water-soluble or water-insoluble initiators or initiator systems which have half-lives for radical decomposition between 0.01 and 400 minutes at temperatures from 10° C. to 100° C. In general, polymerisation is conducted in an aqueous emulsion within said temperature range, preferably between 30 and 90° C., under a pressure of $10^3$ to $2 \times 10^4$ mbar, wherein the exact polymerisation temperature depends on the type of initiator. The initiators are generally used in amounts of 0.05 to 6% by weight with respect to the total amount of monomer.

Examples of suitable initiators include water-soluble and water-insoluble azo compounds such as azoisobutyronitrile or 4,4'-azo-bis-(4-cyanopentanoic acid), and inorganic and organic peroxides such as dibenzoyl peroxide, t-butyl perpivalate, t-butyl-per-2-ethyl hexanoate, t-butyl perbenzoate, t-butyl hydroperoxide, di-t-butyl peroxide, cumene hydroperoxide, dicyclohexyl- and dibenzyl peroxydicarbonates, the sodium, potassium or ammonium salts of peroxydisulphuric acid, and hydrogen peroxide. Peroxydisulphates and hydrogen peroxide are often used in combination with reducing agents such as the sodium salt of formamidinesulphinic acid (Rongalit C), ascorbic acid or polyalkylene polyamines. In general, a considerable reduction in polymerisation temperature is thereby achieved.

Customary regulators can be used in order to regulate the molecular weight of the polymers, such as n-dodecylmercaptan, t-dodecylmercaptan, diisopropylxanthogen disulphide, di(methylenetrimethylolpropane) xanthogen disulphide and thioglycol. It is also possible to use allyl compounds such as the dimer of α-methylstyrene. These substances are added at most in amounts of 3% by weight with respect to the monomer mixture.

After the completion of polymerisation, the polymers which are present in aqueous dispersion are optionally treated with neutralising agents to obtain degrees of neutralisation from 10 to 150% (calculated), preferably 30 to 100%. Inorganic bases, ammonia or amines are added as neutralising agents for this purpose. Sodium hydroxide or potassium hydroxide can be used as inorganic bases, for example. Apart from ammonia, trimethylamine, triethylamine, dimethylethanolamine, methyldiethanolamine, triethanolamine, etc. can be used as amines. The neutralising agents can be used either in a stoichiometric deficit or excess.

It should be noted, however, particularly when a stoichiometric excess of neutralising agent is used, that a considerable increase in the viscosity of the polymer can occur due to the polyelectrolyte character of the system.

The co-solvents which are optionally used can remain in the aqueous dispersion in amounts up to about 20% by weight with respect to the aqueous phase. If need be, however, co-solvents can be removed by distillation after polymerisation.

Polymer dispersions a1) and a2) generally have solids contents of 20 to 60% by weight, preferably 30 to 50% by weight, viscosities of 10 to $10^5$, preferably 10 to $10^4$ mPa.s at 23° C., and pH values of 5 to 10, preferably 6 to 9. They are preferably mixed in ratios by weight ranging from 10:90 to 60:40 (solid resins a1:a2).

The average particle diameter of each component which is present in the dispersion (as measured by means of laser correlation spectroscopy) is generally between 50 and 500 nm, preferably 80 to 250 nm.

Polyisocyanate component b) comprises any organic polyisocyanate which contains aliphatically, cycloaliphatically, araliphatically and/or aromatically bonded free isocyanate groups, and which is liquid at room temperature. Polyisocyanate component b) generally has a viscosity of at the most 10,000, preferably at the most 1000 mPa.s at 23° C. Polyisocyanate component b) most preferably comprises polyisocyanates or polyisocyanate mixtures which exclusively contain aliphatically and/or cycloaliphatically bonded isocyanate groups, an (average) NCO functionality between 2.2 and 5.0 and a viscosity at 23° C. of at the most 500 mPa.s.

The polyisocyanates may optionally be used in admixture with small amounts of inert solvents in order to reduce the viscosity to a value within said ranges. The amount of solvents of this type is calculated so that up to 20% by weight solvent, with respect to the amount of water, is present in the coating medium according to the invention which is finally obtained, wherein the solvent which may still be present in the polymer dispersions or solutions is included in this calculation. Examples of solvents which are suitable for use as additives to the polyisocyanates include aromatic hydrocarbons, such as "solvent naphtha" for example, and also include solvents of the type cited above by way of example.

Polyisocyanates which are particularly suitable as component b) are what are termed "lacquer polyisocyanates" containing aromatically or (cyclo)aliphatically bonded isocyanate groups, wherein the last-mentioned aliphatic polyisocyanates are particularly preferred, as stated above.

Polyisocyanates which have been rendered (partly) hydrophilic are quite particularly preferred.

Examples of "lacquer polyisocyanates" which are particularly suitable include those based on hexamethylene diisocyanate or on 1-isocyanato-3,3,5-trimethyl-5-isocyanatomethyl-cyclohexane (IPDI) and/or bis-(isocyanatocyclohexyl)-methane, particularly those which are based exclusively on hexamethylene diisocyanate.

"Lacquer polyisocyanates" based on these diisocyanates should be understood to include the derivatives of these diisocyanates which are known in the art and which contain biuret, urethane, uretdione and/or isocyanurate groups, and which following their production have been freed in a known manner, preferably by distillation, from excess diisocyanate starting material down to a residual content of less than 0.5% by weight. The aliphatic polyisocyanates which are preferably used according to the invention include polyisocyanates based on hexamethylene diisocyanate and which contain biuret groups, and which comply with the above criteria, such as those which can be obtained, for example by the processes described in U.S. Pat. No. 3,124,605, U.S. Pat. No. 3,358,010, U.S. Pat. No. 3,903,126, U.S. Pat. No. 3,903,127 or U.S. Pat. No. 3,976,622, and which consist of mixtures of N,N',N"-tris-(6-isocyanatohexyl)-biuret with subsidiary amounts of higher homologues thereof, and also include cyclic trimers of hexamethylene diisocyanate which comply with the above criteria, such as those which can be obtained according to U.S. Pat. No. 4,324,879 and which essentially consist of N,N',N"-tris-(6-isocyanatohexyl) isocyanurate in admixture with subsidiary amounts of higher homologues thereof. Polyisocyanates which comply with the above criteria and which are particularly preferred are mixtures of polyisocyanates which contain uretdione and/or isocyanurate groups and which are based on hexamethylene diisocyanate, such as those which are formed by the catalytic oligomerisation of hexamethylene diisocyanate using trialkyl phosphines. The last-mentioned mixtures preferably have a viscosity at 23° C. of at the most 500 mPa.s and an NCO functionality between 2.2 and 5.0.

The aromatic polyisocyanates which are also suitable according to the invention, but which are less preferred, comprise "lacquer polyisocyanates" in particular which are based on 2,4-diisocyanatotoluene or on industrial mixtures thereof with 2,6-diisocyanatotoluene or which are based on 4,4'-diisocyanatodiphenylmethane or mixtures thereof with isomers and/or higher homologues thereof. Examples of aromatic lacquer polyisocyanates of this type include isocyanates which contain urethane groups, such as those which can be obtained by the reaction of excess amounts of 2,4-diisocyanatotoluene with polyhydric alcohols such as trimethylolpropane and subsequent removal by distillation of the unreacted excess of diisocyanate. Examples of other aromatic lacquer polyisocyanates include the trimers of the monomeric diisocyanates cited as examples, i.e. corresponding isocyanatoisocyanurates, which have likewise been freed, preferably by distillation following their production, from excess monomeric diisocyanates.

Any polyisocyanates which can be dispersed in water and which contain aliphatically, cycloaliphatically, araliphatically and/or aromatically bonded isocyanate groups can be used as crosslinking agents for the binder vehicle dispersions according to the invention.

Example of suitable polyisocyanates include polyisocyanates which are ionically modified, e.g. those which contain carboxylate groups and optionally polyether units, of the type cited in EP-A 510 438 and EP-A 548 669, polyisocyanates which contain sulphonate groups, of the type cited in EP-A 703 255, or polyisocyanates which contain phosphate or phosphonate groups, such as those described in WO 97/31960.

However, the crosslinking agent components which are preferably used for the binder vehicle dispersions according to the invention are polyisocyanates which are purely nonionic and which are hydrophilically modified by reaction with polyethylene oxide polyether alcohols. Polyisocyanates such as these are known from EP-A 206 059, EP-A 516 277, EP-B 540 985, EP-A 645 410, EP-A 680 983, U.S. Pat. No. 5,200,489 and from German Patent Application 19822891.0, for example. Non-ionic polyisocyanates which have been rendered hydrophilic and which are also suitable are the polyisocyanate preparations which contain special emulsifiers comprising diisocyanates and monofunctional polyether alcohols and which are cited in EP-B 486 881.

Water-dispersible polyisocyanates which are particularly preferred are the aforementioned polyisocyanates which are hydrophilically modified by means of polyethylene oxide polyether alcohols and which exclusively comprise aliphatically and/or cycloaliphatically bonded isocyanate groups. Water-dispersible polyisocyanates which are quite particularly preferred are those of the aforementioned type which have a uretdione and/or isocyanurate structure and which are based on 1,6-diisocyanatohexane (HDI), 1-isocyanato-3,3, 5-trimethyl-5-isocyanatomethylcyclo-hexane (isophorone diisocyanate, IPDI), and/or 4,4'diisocyanatodicyclohexylmethane.

In addition, polyisocyanate component b) can consist of any mixtures of the polyisocyanates cited as examples.

In order to produce the ready-to-use coating media, polyisocyanate component b) is emulsified in the aqueous dispersion of polymers a), whereupon the dissolved or dispersed polymer at the same time performs the function of an emulsifier or of a reactive component for the added polyisocyanate.

Mixing throughout can be effected simply by stirring at room temperature. The amount of polyisocyanate component is calculated so that an NCO/OH equivalent ratio of 0.2:1 to 5:1, preferably 0.5:1 to 2:1, results with respect to the isocyanate groups of component b) and the alcoholic hydroxyl groups of component a). Before adding polyisocyanate component b), customary adjuvant substances and additives can be added to polymer component a), i.e. to the dispersion or solution of the polymers. Examples of adjuvant substances and additives such as these include antifoaming agents, flow enhancers, pigments, dispersion agents for pigment distribution and the like.

According to the invention, the polyol components crosslink with the polyisocyanates in such a way that fixation of the elastomer phase and of the thermoplastic phase (a2) is effected, whereby mixing which is too extensive is prevented. This is demonstrated in the examples with reference to the separately detectable glass transition temperatures.

The present invention further relates to the use of the coating media according to the invention. They are suitable for practically all areas of use in which solvent-containing, solvent-free or other types of aqueous paint and coating systems which possess an enhanced property profile are currently employed, e.g. the coating of practically all mineral building materials, such as lime-bonded or cement-bonded plaster, surfaces which contain gypsum, fibre-reinforced cement building materials, concrete; lacquer-coating and sealing of wood and timber materials such as chipboard and wood fibre board and also of paper; lacquer-coating and sealing of metallic surfaces; coating and lacquering of road surfaces containing asphalt and bitumen; lacquering and sealing of diverse plastics surfaces; coating of leather and textiles. They are also suitable for the all-over adhesive bonding of diverse materials, wherein different materials and materials of the same type can be bonded to each other.

The coating of plastics surfaces is particularly preferred. There is a requirement here for coating systems which exhibit an enhanced impact strength even at low temperatures (down to −20° C.) whilst exhibiting a good resistance to solvents and chemicals at the same time.

After application to the substrate concerned, curing or crosslinking of the two-component system can be effected at temperatures from 5 to 300° C., preferably between room temperature and 200° C.

In the following examples, all percentages are given as percentages by weight.
Production of Elastomer Components a1)

EXAMPLES A AND B

The initial batches I (see Table 1) were placed in a 3 liter stirred reactor fitted with an effective stirrer, reflux condenser and gas inlet and outlet and were flushed with nitrogen. A continuous stream of nitrogen was subsequently passed over the batch, which was heated to 80° C. whilst stirring at about 200 rpm. The monomer mixtures II and initiator solutions III given in Table 1 were subsequently rapidly added. After a reaction time of 30 minutes, monomer mixtures IV and the initiator solutions V were steadily metered in over the course of 4 hours. The batch was subsequently stirred for 2 hours and thereafter was activated with initiator solutions VI. Thereafter, the batch was stirred for 4 hours and about 50 ml of a mixture of water and residual monomers was removed by distillation under a slight vacuum of 200 to 300 mbar from a water pump. The batch was subsequently cooled to room temperature and solution VII was added for neutralisation.

The physicochemical properties of the aqueous polymer dispersions are also listed in Table 1.

TABLE 1

|  | A | B |
|---|---|---|
| I. Initial batch | | |
| emulsifier A* (80%) | 25 g | — |
| emulsifier B** | — | 20 g |
| ammonia (25%) | — | 5 g |
| deionised water | 800 g | 800 g |
| II. Monomer mixture for the batch phase | | |
| acrylic acid | 1 g | 1 g |
| hydroxypropyl methacrylate | 8 g | 8 g |
| n-butyl acrylate | 88 g | — |
| 2-ethylhexyl acrylate | — | 88 g |
| allyl methacrylate | 1 g | 1 g |
| III. Initiator solution for the batch phase | | |
| ammonium peroxydisulphate | 0.5 g | 0.5 g |
| deionised water | 10 g | 10 g |
| IV. Monomer mixture for the feed phase | | |
| acrylic acid | 9 g | 9 g |
| hydroxypropyl methacrylate | 76 g | 76 g |
| n-butyl acrylate | 788 g | — |
| 2-ethylhexyl acrylate | — | 788 g |
| allyl methacrylate | 9 g | 9 g |
| V. Initiator solution for feed phase | | |
| ammonium peroxydisulphate | 3 g | 3 g |
| deionised water | 600 g | 600 g |
| VI. Initiator solution for post-activation | | |
| ammonium peroxydisulphate | 1 g | 1 g |
| deionised water | 10 g | 10 g |
| VII. Neutralisation solution | | |
| 2-dimethylaminoethanol | 8 g | 8 g |
| deionised water | 100 g | 100 g |
| solids content (% by weight) | 38.9 | 40.4 |
| pH | 7.1 | 7.6 |
| viscosity at D = 21.1 sec$^{-1}$ (mPa · s) | <100 | ~82 |
| average particle diameter (nm) | 106 | 109 |
| hydroxyl content (with respect to solid resin) [% by weight] | 1.0 | 1.0 |
| glass transition temperature (by the DSC method) (° C.) | −37 | — |

*emulsifier A: a monosulphuric acid ester (ammonium salt) of a reaction product of dodecanol and oligo-ethylene oxide
**emulsifier B: dodecylbenzenesulphonic acid

EXAMPLES C TO F

The initial batches I (see Table 2) were placed in a 3 liter stirred reactor fitted with an effective stirrer, reflux condenser and gas inlet and outlet and were flushed with nitrogen. A continuous stream of nitrogen was subsequently passed over the batch, which was heated to 80° C. whilst stirring at about 200 rpm. The monomer mixtures II and initiator solutions III given in Table 2 were subsequently added very rapidly. After a reaction time of 30 minutes, the addition was commenced of monomer mixtures IV and of initiator solutions V; IV was steadily added over 2 hours, and V was steadily added over 4 hours. After the addition of monomer mixtures IV was complete, the addition of monomer mixtures VI was commenced; VI were steadily added over 2 hours. The batch was subsequently stirred for 2 hours and was thereafter post-activated with initiator solutions VII. Thereafter, the batch was stirred for 4 hours and was then cooled to room temperature and solution VIII was added for neutralisation. The dispersions were subsequently filtered and drawn off.

The physicochemical properties of the aqueous polymer dispersions are also listed in Table 2.

TABLE 2

|  | C | D | E | F |
|---|---|---|---|---|
| I. Initial batch | | | | |
| emulsifier A | 12.5 g | 12.5 g | 12.5 g | 12.5 g |
| deionised water | 600 g | 600 g | 600 g | 600 g |
| II. Monomer mixture (batch phase) | | | | |
| acrylic acid | 1 g | 1 g | — | — |
| hydroxypropyl methacrylate | 8 g | 8 g | — | — |
| n-butyl acrylate | 88 g | 89 g | 94.7 g | 94.7 g |
| allyl methacrylate | 1 g | — | — | — |
| 2-hydroxyethyl acrylate | — | — | 3.3 g | 3.3 g |
| III. Initiator solution (batch phase) | | | | |
| ammonium peroxydisulphate | 0.5 g | 0.5 g | 0.5 g | 0.5 g |
| deionised water | 10 g | 10 g | 10 g | 10 g |
| IV. Monomer mixture I (feed phase) | | | | |
| hydroxypropyl methacrylate | 18.7 g | 18.7 g | — | — |
| n-butyl acrylate | 417.8 g | 422.3 g | 426 g | 426 g |
| allyl methacrylate | 4.5 g | — | — | — |
| 2-hydroxyethyl acrylate | — | — | 15 g | 15 g |
| emulsifier A | 6.25 g | — | — | — |
| V. Initiator solution (feed phase) | | | | |
| ammonium per-oxydisulphate | 3 g | 3 g | 3 g | 3 g |
| emulsifier A | — | 12.5 g | 12.5 g | 2.5 g |
| deionised water | 700 g | 700 g | 700 g | 700 g |
| VI. Monomer mixture II (feed phase) | | | | |
| hydroxypropyl methacrylate | 57.3 g | 58.3 g | — | — |
| n-butyl acrylate | 370.2 g | 373.7 g | 381.3 g | 347.3 g |
| allyl methacrylate | 4.5 g | — | — | — |
| 2-hydroxyethyl acrylate | — | — | 49.7 g | 83.7 g |
| acrylic acid | 9 g | 9 g | 10 g | 10 g |
| emulsifier A | 6.25 g | — | — | — |
| VII. Initiator solution (post-activation) | | | | |
| ammonium per-oxydisulphate | 1 g | 1 g | 1 g | 1 g |
| deionised water | 10 g | 10 g | 10 g | 10 g |
| VIII. Neutralisation solution | | | | |
| 2-dimethyl-aminoethanol | 8 g | 8 g | — | — |
| ammonia (25%) | — | — | 11 g | 16 g |
| deionised water | 100 g | 20 g | 20 g | 20 g |
| solids content (% by weight) | 40.4 | 42.3 | 43.2 | 42.8 |
| pH | 7.8 | 6.7 | 7.3 | 7.1 |
| viscosity at D = 21.1 sec$^{-1}$ (mPa · s) | <100 | <100 | 305 | 380 |
| average particle diameter (nm) | 101 | 219 | 104 | 212 |
| acid number (mg KOH/g lacquer solids) | 6.5 | 6.9 | 6.7 | 6.1 |

Production of Thermoplastic Components a2)

EXAMPLES G

An initial batch comprising 25 g of 80% emulsifier A and 450 g deionised water was placed in a 3 liter stirred reactor fitted with an effective stirrer, reflux condenser and gas inlet and outlet and was flushed with nitrogen A continuous stream of nitrogen was subsequently passed over the batch, which was heated to 65° C. whilst stirring at about 200 rpm. A monomer mixture comprising 3 g acrylic acid, 17 g hydroxypropyl methacrylate, 50 g methyl methacrylate and 28 g n-butyl acrylate, as well as an initiator solution comprising 0.5 g t-butyl hydroperoxide, 1 g of a 0.1 solution of iron sulphate (containing 2% by weight of Trilon B) and 4 g deionised water, and a reducing agent solution comprising 0.3 g Rongalit C (a sodium salt of formamidine-sulphinic acid) and 5 g deionised water were subsequently rapidly added. After a reaction time of 30 minutes, a further monomer mixture comprising 27 g acrylic acid, 152 g hydroxypropyl methacrylate, 450 g methyl methacrylate and 253 g n-butyl acrylate was added steadily over 4 hours, together with an initiator solution comprising 3.5 g t-butyl hydroperoxide, 7.2 g of the aforementioned iron sulphate solution and 393 g deionised water, as well as a reducing agent solution comprising 2 g Rongalit C and 400 g deionised water. Thereafter, the batch was stirred for a further 2 hours, and was then cooled to 45° C. and was post-activated with an initiator solution comprising 1 g t-butyl hydroperoxide, 2 g of the aforementioned iron sulphate solution and 3 g dejonised water as well as a reducing agent solution comprising 0.7 g Rongalit C and 5 g deionised water. The batch was stirred for a further 4 hours at 45° C. and about 50 ml of a mixture of residual monomers and water was subsequently removed by distillation under a slight water pump vacuum of 200 to 300 mbar. The batch was subsequently cooled to room temperature and was neutralised with an aqueous solution comprising 16 g of a 25% by weight solution of ammonia and 100 g deionised water.

The physicochemical properties of the aqueous polymer dispersions were as follows:

solids content (% by weight) 41.6 pH 7.5 viscosity at RT and D=21.1 sec$^{-1}$ (mPa.s) 2300 average particle diameter (LCS) (nm) 96 glass transition temperature (by the DSC method) (°C.) +55° C.

EXAMPLE H
(Core-shell Structure)

An initial batch comprising 12.5 g of 80% emulsifier A and 700 g deionised water was placed in a 3 liter stirred reactor fitted with an effective stirrer, reflux condenser and gas inlet and outlet and was flushed with nitrogen A continuous stream of nitrogen was subsequently passed over the batch, which was heated to 80° C. whilst stirring at about 200 rpm. A monomer mixture comprising 3 g acrylic acid, 17 g hydroxypropyl methacrylate, 50 g methyl methacrylate and 28 g n-butyl acrylate, as well as an initiator solution comprising 0.5 g ammonium peroxydisulphate and 25 g deionised water, was subsequently added rapidly. After a reaction time of 30 minutes, a further monomer mixture comprising 27 g acrylic acid, 37 g hydroxypropyl methacrylate, 404 g methyl methacrylate and 6.25 g of 80% emulsifier A was steadily added over 2 hours, and an initiator solution comprising 3 g ammonium peroxydisulphate and 600 g deionised water was steadily added over 4 hours. Immediately after the addition of the monomer mixture was complete, the addition was commenced of a further monomer mixture comprising 27 g acrylic acid, 115 g hydroxypropyl methacrylate, 46 g methyl methacrylate, 253 g n-butyl methacrylate and 6.25 g of 80% emulsifier A. This monomer mixture was added over 2 hours. Thereafter, the batch was stirred for a further 2 hours, and was then cooled to 45° C. and was post-activated with an initiator solution comprising 0.5 g ammonium peroxydisulphate and 10 g deionised water. The batch was stirred for a further 4 hours, and was cooled to room temperature and neutralised with an aqueous solution comprising 16 g of a 25% by weight solution of ammonia and 20 g deionised water. Thereafter, it was filtered and drawn off.

The physicochemical properties of the aqueous polymer dispersions were as follows:

solids content (% by weight) 41.4 pH 6.9 viscosity at RT and D=21.1 sec$^{-1}$ (mPa.s) <100 average particle diameter (LCS) (nm) 112 acid number (mg KOH/g Lacquer solids) 12.8 conductivity (mS/m) 5.94 glass transition temperature (by the DSC method) (°C.) 16.5

Polyisocyanate 1

1.0 equivalent of a polyisocyanate which contained isocyanurate groups and which was based on 1,6-diisocyanatohexane (HDI), with an NCO content of 21.5%, an average NCO functionality of about 3.8 and a viscosity of 3000 mPa.s (23° C.) was mixed at room temperature and with stirring with 0.08 equivalent of a monofunctional polyethylene oxide polyether which was produced using methanol as a starting material and which had an average molecular weight of 350, and the batch was subsequently heated for 3 hours at 100° C. After cooling to room temperature, a practically colourless, clear polyisocyanate mixture was obtained. The NCO content was 17.3%, the content of ethylene oxide units was 11.3% and the viscosity was 3050 mPa.s (23° C.).

EXAMPLES OF USE

Examples 1 and 2

77.1 parts by weight of elastomer component A (corresponding to 30 parts solid resin) were intensively mixed with 168.3 parts by weight of thermoplastic component G (corresponding to 70 parts solid resin) (for 5 minutes, in an Ultra-Turrax device) and were diluted with 11 parts by weight water. 10.1 parts by weight polyisocyanate 1 were subsequently added and intensively mixed (for 5 minutes, in an Ultra-Turrax device). Films were subsequently sprayed, free from bubbles, on to glass plates or on to polypropylene sheets to give free films with dry coat thicknesses from 80 to 120 μm, which were conditioned for 1 hour at room temperature, 0.5 hours at 80° C. and 16 hours at 60° C., as well as for 1 day in a normal climate.

Tensile tests performed on free lacquer films enable predictions to be made concerning the effect of a lacquer applied to a plastics material on the toughness properties of the lacquer-coated plastics part. These predictions are based on the following experience:

The impact strength of plastics is generally adversely affected by a coating, because a crack in the coating can initiate a fracture in the plastics part due to the notch effect of the crack. This results in lacquer-coated plastics parts exhibiting a lower energy absorption in the biaxial impact penetration test according to DIN 53 443 than that of plastics which are uncoated with lacquer. At low temperatures in particular, the crack-initiating effect of the coating can be of such an extent that a tough fracture behaviour of the plastics material is suddenly changed by the lacquer coating into a brittle fracture behaviour with a low energy absorption.

Experience has shown that ductile fracture behaviour in the tensile testing of free lacquer films correlates with only a slight impairment of the impact strength of plastics by the corresponding coating. The elongation at break of free lacquer films has proved to be useful as a quantitative measure of a low extent of impairment of toughness. The higher is the elongation at break of the free lacquer film, the lower is the extent of impairment of the impact strength of plastics by the corresponding coating.

In addition, dynamic mechanical tensile tests (DMA) were performed on free lacquer films in order to assess the glass transition behaviour thereof. Two glass transitions, and thus the two-phase nature of the lacquers, were detected in each case from the maxima in the loss modulus E" as a function of temperature.

The resistance to chemicals and the König pendulum hardness were determined on films on glass plates. The following results (see Table 3) were obtained:

TABLE 3

Application technology properties and physicochemical properties of the three-component PUR system polyol A + polyol G (3:7)/polyisocyanate 1 (NCO:OH = 1.4)

| | |
|---|---|
| film coat thickness (glass plate) | 100 μm |
| pendulum hardness (König) | 111 sec |
| glass transition temperatures (DMA measurements) | −28° C./+60° C. |
| elongation at break (RT) (coat thickness 110 μm) | 26.5 MPa |
| elongation at break (RT) (coat thickness 110 μm) | 25.4% |
| elongation at break (−20° C.) (coat thickness 110 μm) | 53.4 MPa |
| elongation at break (−20° C.) (coat thickness 110 μm) | 7.1%* |
| tar stain-resistance after | |
| 1 hour | 0** |
| 3 hours | 0–1 |
| 8 hours | 1 |
| 24 hours | 2 |

*a single-phase, acrylate-based copolymer dispersion (according to EP-A 358 979) cured with a polyisocyanate which had been reacted to form an allophanate (according to EP-A 496 208 and EP-A 649 866) exhibited an elongation at break of only 3.4% at −20° C. (comparative system 1)
**ranking scale:
0: very resistant
5: not resistant.

Even more significant were the differences between comparative system 1 (see Table 3) and Example of use 1 in impact penetration tests according to DIN 53 443 which were performed on lacquer-coated polybutylene terephthalate. Pocan® KU 7916/2 was coated by first applying a polyurethane metallic base lacquer (HMBC VP LS 2952) followed by a coating of the aforementioned aqueous 2-component PUR systems as clear lacquers. The energy absorption at break was measured as a function of temperature. The results are listed in Table 4.

TABLE 4

Test results of impact penetration tests at different temperatures (testing performed on Pocan ® = polybutylene terephthalate)

| | Example of use 1 | Comparative example 1 |
|---|---|---|
| energy absorption at 23° C. [J] | 73.8 | 68.4 |
| nature of fracture at 23° C. | ductile | ductile |
| energy absorption at 0° C. [J] | 103.5 | 14.2 |
| nature of fracture at 0° C. | ductile | ductile- brittle |
| energy absorption at −20° C. [J] | 26.7 | <10 |
| nature of fracture at −20° C. | ductile- brittle | brittle |

Examples 2 and 3

The parts by weight of elastomer components C or D given in Table 5 (corresponding to 30 parts solid resin) were intensively mixed with 169.1 parts by weight of thermoplastic component H (corresponding to 70 parts by weight solid resin) and with were diluted with 16 parts by weight water. The parts by weight of polyisocyanate 1 given in Table 5 were then added and intensively mixed.

All the films which were produced as in Example 1 were subsequently conditioned and subjected to application technology testing and to physicochemical testing. The following results were obtained.

TABLE 5

Application technology properties and physicochemical properties of Examples 2 and 3 (NCO:OH = 1.0)

| | Example 2 | Example 3 |
|---|---|---|
| parts by weight component C | 74.3 | — |
| parts by weight component D | — | 70.9 |
| parts by weight polyisocyanate 1 | 10.1 | 10.2 |
| pendulum hardness (König) (at film coat thickness [μm]) | 68/(90) | 60/(80) |
| glass transition temperatures (DMA measurements) | −31° C./+49° C. | −36° C./+43° C. |
| tensile strength (RT) [MPa] (at film coat thickness [μm]) | 25.5/(143) | 24.6/(102) |
| elongation at break (RT) [%] | 55.2 | 47.5 |
| tensile strength (0° C.) [MPa] | 34.0 | 33.0 |
| elongation at break (0° C.) [%] | 25.8 | 17.1 |
| tensile strength (−20° C.) [MPa] | 45.4 | 45.8 |
| elongation at break (−20° C.) L%] | 10.6 | 10.9 |
| tar stain-resistance after | | |
| 1 hour | 0 | 0 |
| 8 hours | 1 | 1 |
| 24 hours | 2 | 2 |

A comparison of crosslinked elastomer component C with uncrosslinked elastomer component D shows that there were no significant differences between the physicochemical or application technology properties of two-component PUR systems 2 and 3.

Examples 4 and 5

The parts by weight of elastomer components D and F given in Table 6 were intensively mixed with 168.7 parts by weight of thermoplastic component H (corresponding to 70 parts by weight solid resin) and were diluted with 11 parts by weight water. The parts by weight of polyisocyanate 1 given in Table 6 were then added and intensively mixed. Films were subsequently produced and conditioned as described in Example 1, and were subjected to application technology tests and physicochemical tests using the same methods. The following results were obtained.

TABLE 6

Application technology properties and physicochemical properties of Examples 4 and 5 (NCO:OH = 1.4)

| | Example 4 | Example 5 |
|---|---|---|
| parts by weight component D | 70.9 | — |
| parts by weight component F | — | 70.1 |
| parts by weight polyisocyanate 1 | 14.3 | 15.6 |
| pendulum hardness (König) [sec] | 35/(135) | 37/(120) |
| glass transition temperatures (DMA measurements) | −41° C./+46° C. | −44° C./+47° C. |
| tensile strength (RT) [MPa] | 20.9/(164) | 25.4/(134) |
| elongation at break (RT) [%] | 31.9 | 29.7 |
| tensile strength (0° C.) (MPa) | 33.4 | 34.5 |
| elongation at break (0° C.) [%] | 14.2 | 11.4 |

TABLE 6-continued

Application technology properties and physicochemical properties of Examples 4 and 5 (NCO:OH = 1.4)

|  | Example 4 | Example 5 |
|---|---|---|
| tensile strength (−20° C.) [Mpa] | 42.7 | 43.9 |
| elongation at break (−20° C.) [%] | 8.6 | 9.2 |
| tar stain-resistance after |  |  |
| 1 hour | 1 | 0 |
| 3 hours | 3 | 1 |
| 8 hours | 3 | 1 |
| 24 hours | 3 | 3 |

Systems 4 and 5 exhibited very similar behaviour as regards their properties as thermoplastic elastomers. System 5 exhibited a significantly better tar stain-resistance, however.

What is claimed is:

1. A two-component polyurethane coating composition containing a binder which comprises
   a) an aqueous solution and/or dispersion of a polyol component containing at least two vinyl polymer polyols, wherein a first elastomeric vinyl polymer polyol a1) is present as a discrete phase in a second thermoplastic vinyl polymer polyol a2) and
   b) a polyisocyanate component which has a viscosity of at the most 10,000 mPa.s, contains at least one organic polyisocyanate and is emulsified or solubilized in aqueous component a),
wherein components a) and b) are present at an NCO/OH equivalent ratio from 0.2:1 to 5:1.

2. The coating composition of claim 1 wherein the elastomeric vinyl polymer polyol a1) is prepared from olefinically unsaturated monomers containing hydroxyl groups, sulphonate and/or carboxylate groups and optionally sulphonic acid and/or carboxyl groups, and has a molecular weight $M_n$ of 500 to 500,000 g/mol, a hydroxyl number of 8 to 264 mg KOH/g solid resin, an acid number of 0 to 100 mg KOH/g solid resin and a glass transition temperature of at most 0° C.

3. The coating composition of claim 1 wherein the thermoplastic vinyl polymer polyol a2) is prepared from olefinically unsaturated monomers containing hydroxyl groups, sulphonate and/or carboxylate groups and optionally sulphonic acid and/or carboxyl groups, and has a molecular weight $M_n$ of 500 to 500,000 g/mol, a hydroxyl number of 16 to 264 mg KOH/g solid resin, an acid number of 3 to 100 mg KOH/g solid resin and a glass transition temperature of at least 0° C.

4. The coating composition of claim 1 wherein polyisocyanate component b) comprises a hydrophilic polyisocyanate.

5. The coating composition of claim 4 wherein the hydrophilic polyisocyanate is rendered hydrophilic with a monofunctional polyether prepared from ethylene oxide.

6. The coating composition of claim 1 wherein the elastomeric vinyl polymer polyol a1) is a core-shell polymer having a hydrophobic core and a hydrophilic shell.

7. The coating composition of claim 1 wherein the thermoplastic vinyl polymer polyol a2) is a core-shell polymer having a hydrophobic core and a hydrophilic shell.

8. A process for producing the two-component polyurethane coating composition of claim 1 comprising emulsifying or solubilizing polyisocyanate component b) in aqueous component a).

9. A substrate coated with the two-component polyurethane coating composition of claim 1.

* * * * *